United States Patent
Jeon

(10) Patent No.: US 7,904,120 B2
(45) Date of Patent: Mar. 8, 2011

(54) MOBILE COMMUNICATION TERMINAL CAPABLE OF PERFORMING OTHER FUNCTIONS WHILE OUTPUTTING DMB TO EXTERNAL AV DEVICE

(75) Inventor: Myung-Sik Jeon, Seoul (KR)

(73) Assignee: Samsung Electronics Co., Ltd (KR)

( * ) Notice: Subject to any disclaimer, the term of this patent is extended or adjusted under 35 U.S.C. 154(b) by 1179 days.

(21) Appl. No.: 11/546,040

(22) Filed: Oct. 11, 2006

(65) Prior Publication Data

US 2007/0111660 A1    May 17, 2007

(30) Foreign Application Priority Data

Nov. 14, 2005  (KR) .................. 10-2005-0108704

(51) Int. Cl.
*H04M 1/00*    (2006.01)
(52) U.S. Cl. .................. 455/569.2; 455/414.1; 455/418; 455/419
(58) Field of Classification Search .............. 455/3.04, 455/414.1, 418, 419, 557, 569.2
See application file for complete search history.

(56) References Cited

U.S. PATENT DOCUMENTS

| 2005/0032507 | A1 | 2/2005 | Na et al. |
| 2005/0255882 | A1* | 11/2005 | Tsao .................. 455/556.1 |
| 2005/0261033 | A1* | 11/2005 | Wang .................. 455/566 |
| 2006/0223503 | A1* | 10/2006 | Muhonen et al. ........ 455/414.1 |

FOREIGN PATENT DOCUMENTS

| CN | 1261241 | 7/2000 |
| CN | 1578503 | 2/2005 |
| GB | 2 347 051 | 8/2000 |

* cited by examiner

Primary Examiner — Tuan H Nguyen
(74) Attorney, Agent, or Firm — The Farrell Law Firm, P.C.

(57) ABSTRACT

Provided is a mobile communication terminal capable of receiving Digital Multimedia Broadcasting (DMB), which includes a mobile communication terminal module, a DMB module, an external broadcasting output unit, a user interface unit, and a controller. The mobile communication terminal module provides various functions of the mobile communication terminal except for DMB. The DMB module receives and outputs DMB. The external broadcasting output unit outputs DMB received through the DMB module to an external Audio/Video (AV) device. The user interface unit provides operations of the mobile communication terminal mode and the DMB module for viewing continuity and receiving an input from the user. The controller designates the mobile communication terminal module for inputting an operating signal from and outputting the operating signal to the user interface unit if the controller senses a switching command signal for switching to the mobile communication terminal module through the user interface unit while DMB is output to the external AV device through the external broadcasting output unit.

9 Claims, 5 Drawing Sheets

MOBILE COMMUNICATION TERMINAL CAPABLE OF PERFORMING OTHER FUNCTIONS WHILE OUTPUTTING DMB TO EXTERNAL AV DEVICE

PRIORITY

This application claims priority under 35 U.S.C. §119 to an application entitled "Mobile Communication Terminal Capable of Performing Other Functions while Outputting DMB to External AV Device" filed in the Korean Intellectual Property Office on Nov. 14, 2005 and assigned Ser. No. 2005-108704, the contents of which are incorporated herein by reference.

BACKGROUND OF THE INVENTION

1. Field of the Invention

The present invention generally relates to a mobile communication terminal capable of receiving Digital Multimedia Broadcasting (DMB), and in particular, to a mobile communication terminal for outputting DMB to an external Audio/Video (AV) device.

2. Description of the Related Art Generally, a mobile communication terminal capable of receiving Digital Multimedia Broadcasting (DMB) is manufactured as a small sized. device, allowing users to easily carry it with them. As a result, users must watch DMB on a small screen in their homes or other indoor environments. To solve the problem, a DMB signal received by a mobile communication terminal may be output to an external Audio/Video (AV) device such as a computer or a television. Thus, the users can watch DMB on a large screen with high-quality sound.

However, when DMB is output to an external AV device, users must terminate DMB to use other functions of the mobile communication terminal even if DMB is not output directly through the mobile communication terminal. This is because the mobile communication terminal switches its operating mode according to user's key input. In other words, even though DMB is output to an external AV device, a user interface unit of the mobile communication terminal, such as a display unit, an audio output unit, or a key input unit, cannot be used simultaneously for other purposes.

For example, when a user inputs a key for using various functions of the mobile communication terminal, the mobile communication terminal switches its current operating mode to a function mode desired by the user. Such switching can be done by sensing a signal generated by user's key input in the mobile communication terminal.

In this way, the mobile communication terminal switches its operating mode when DMB is being output to the external AV device. Since the mobile communication terminal remains in a single operating mode, the user cannot use other functions of the mobile communication terminal that are not active when outputting DMB to the external AV device. The process for the mobile communication terminal terminating a DMB mode upon input of a key for performing a predetermined function from the user while outputting DMB to the external AV device, will be described in detail with reference to FIGS. 1 and 2.

FIG. 1 is a flowchart illustrating a process in which a conventional mobile communication terminal, capable of receiving DMB, changes its functions while outputting DMB to an external AV device.

In step S10, the conventional mobile communication terminal outputs DMB to an external AV device as illustrated in FIG. 2. To use a specific function of the mobile communication terminal while watching DMB, a user must input a DMB termination key. The mobile communication terminal checks if the DMB termination key is input in step S20.

If the DMB termination key is input, the mobile communication terminal terminates a DMB mode in step S30. Thus, the mobile communication terminal switches its operating mode to a standby mode and the user can input a predetermined key for using the specific desired function of the mobile communication terminal. In the standby mode, the mobile communication terminal checks if the predetermined key is input in step S40. If so, the mobile communication terminal performs the specific function corresponding to the input key in step S50. Thus, the user can use the specific function of the mobile communication terminal.

As such, the conventional mobile communication terminal cannot perform other functions while outputting DMB to the external AV device. The user watching DMB through the external AV device must terminate the DMB mode to use other functions of the mobile communication terminal even if DMB is not output directly through the mobile communication terminal.

SUMMARY OF THE INVENTION

It is, therefore, an object of the present invention to provide a mobile communication terminal capable of performing other functions while outputting Digital Multimedia Broadcasting (DMB) to an external AV device.

According to one aspect of the present invention, there is provided a mobile communication terminal capable of receiving Digital Multimedia Broadcasting (DMB). The mobile communication terminal includes a mobile communication terminal module, a DMB module, an external broadcasting output unit, a user interface unit, and a controller. The mobile communication terminal module provides various functions of the mobile communication terminal but not DMB. The DMB module receives and outputs DMB. The external broadcasting output unit outputs DMB received through the digital multimedia broadcasting module to an external Audio/Video (AV) device. The user interface unit provides operations of the mobile communication terminal mode and the DMB module to permit continuity of viewing for the user and receives an input from the user. The controller designates the mobile communication terminal module as a module for inputting an operating signal from and outputting the operating signal to the user interface unit, if the controller senses a switching command signal for switching the module to the mobile communication terminal module through the user interface unit while DMB is output to the external AV device through the external broadcasting output unit.

BRIEF DESCRIPTION OF THE DRAWINGS

The above and other objects, features, and advantages of exemplary embodiments of the present invention will be more apparent from the following description taken in conjunction with the accompanying drawings, in which.

DETAILED DESCRIPTION OF THE PREFERRED EMBODIMENT

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness.

Figure 1:
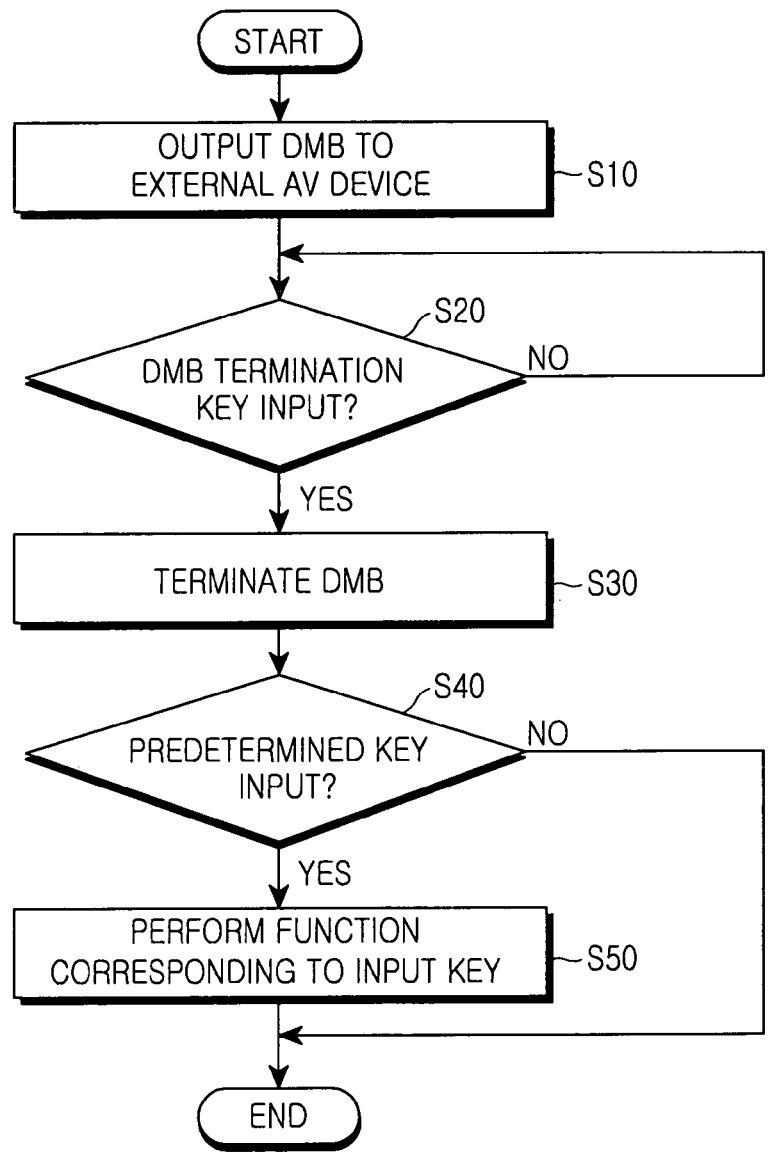
FIG. 1 is a flowchart illustrating a process in which a conventional mobile communication terminal capable of receiving Digital Multimedia Broadcasting (DMB) changes its functions while outputting DMB to an external AV device.
Figure 2:
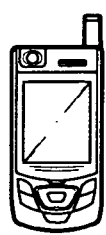
FIG. 2 illustrates DMB that is output from a conventional mobile communication terminal to an external AV device.
Figure 2:
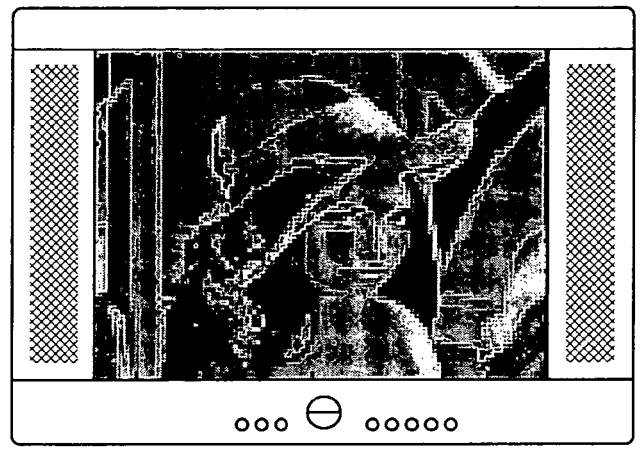
Figure 3:
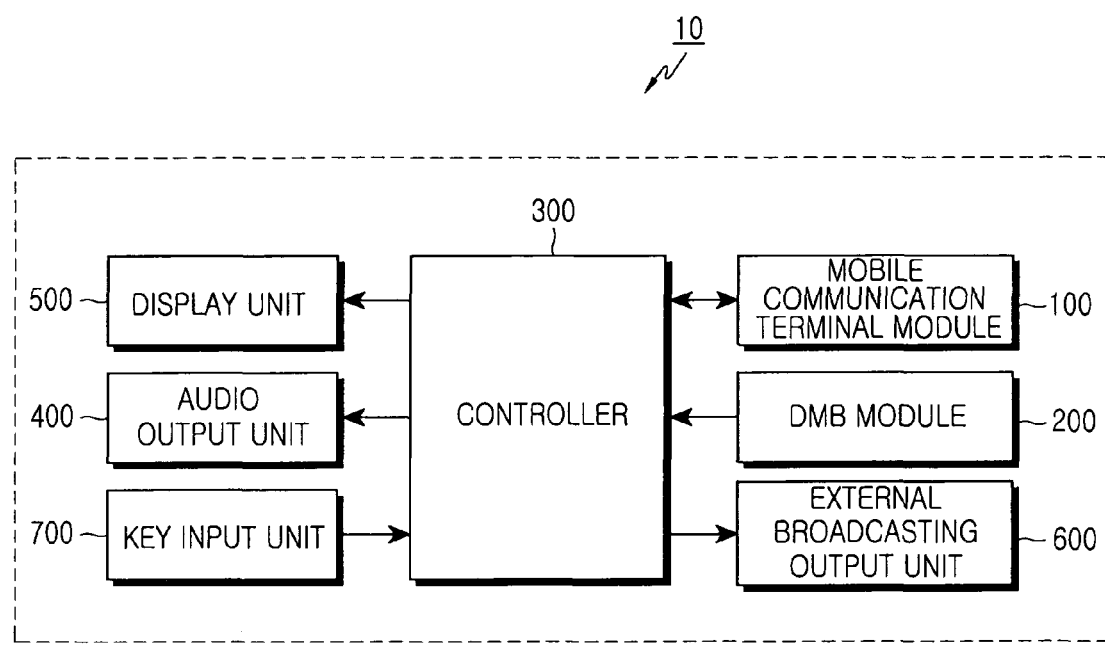
FIG. 3 is a block diagram of a mobile communication terminal which outputs DMB to an external AV device according to the present invention.

FIG. 3 is a block diagram of a mobile communication terminal 10 which outputs Digital Multimedia Broadcasting (DMB) to an external AV device according to the present invention. In the mobile communication terminal 10, a mobile communication terminal module 100 provides various functions of the mobile communication terminal 10 except for DMB. A DMB module 200 receives, demodulates, and decodes DMB to convert it into audio signals and video signals that can be recognized by a user and outputs the audio signals and the video signals to an audio output unit 400 and a display unit 500 under the control of a controller 300. An external broadcasting output unit 600 outputs DMB received through the DMB module 200 to an external AV device.

A user interface unit provides for operation of the mobile communication terminal module 100 and the DMB module 200 for permitting continuity of viewing, receives user input, and provides the user input to the controller 300. The user interface unit includes the display unit 500 that displays video signals generated through various functions of the mobile communication terminal module 100, receives video signals from the DMB module 200, and outputs the received video signals. The user interface unit also includes the audio output unit 400 that outputs audio signals generated through various functions of the mobile communication terminal module 100, receives audio signals from the DMB module 200, and outputs the received audio signals. The user interface unit also includes a key input unit 700 that receives a key input for DMB and a key input for using various functions of the mobile communication terminal 10 and outputs these key inputs to the controller 300. The key input unit 700 includes a mode switching key (not shown) that generates a switching command signal for switching a module for inputting an operating signal from and outputting the operating signal to the user interface unit from the mobile communication terminal module 100 to the DMB module 200 and from the DMB module 200 to the mobile communication terminal module 100. The mode switching key may be included as a dedicated key in the key input unit 700 or implemented with a key for generating the switching command signal if pressed for a predetermined amount of time, i.e., a hot key, among keys of the key input unit 700.

The controller 300 checks if the switching command signal for switching the module to the mobile communication terminal module 100 is generated by the mode switching key when DMB is output to the external AV device through the external broadcasting output unit 600. If the switching command signal for switching the module to the mobile communication terminal module 100 is sensed, the controller 300 outputs a key input signal generated by the key input unit 700 to the mobile communication terminal module 100 and outputs video signals or audio signals generated by the mobile communication terminal module 100 to the display unit 500 and the audio output unit 400.

In other words, the controller 300 controls the operation of the user interface unit according to a function of the mobile communication module 100 that is not affected by the output of DMB through the external broadcasting output unit 600. The controller 300 checks if the switching command signal for switching the module to the DMB module 200 is generated by the mode switching key when the mobile communication terminal module 100 is designated as the module for input/output of the operating signal. If the switching command signal for switching the module to the DMB module 200 is sensed, the controller 300 outputs a key input signal generated by the key input unit 700 to the DMB module 200 and outputs video signals or audio signals generated by the DMB module 200 to the display unit 500 and the audio output unit 400. In other words, the controller 300 switches the module whenever the controller senses the switching command signal generated by the user pressing the mode switching key. A process of automatically providing a function of the mobile communication terminal 10 while outputting DMB to the external AV device without input of the mode switching key will be described in detail with reference to FIG. 4.

Figure 4:
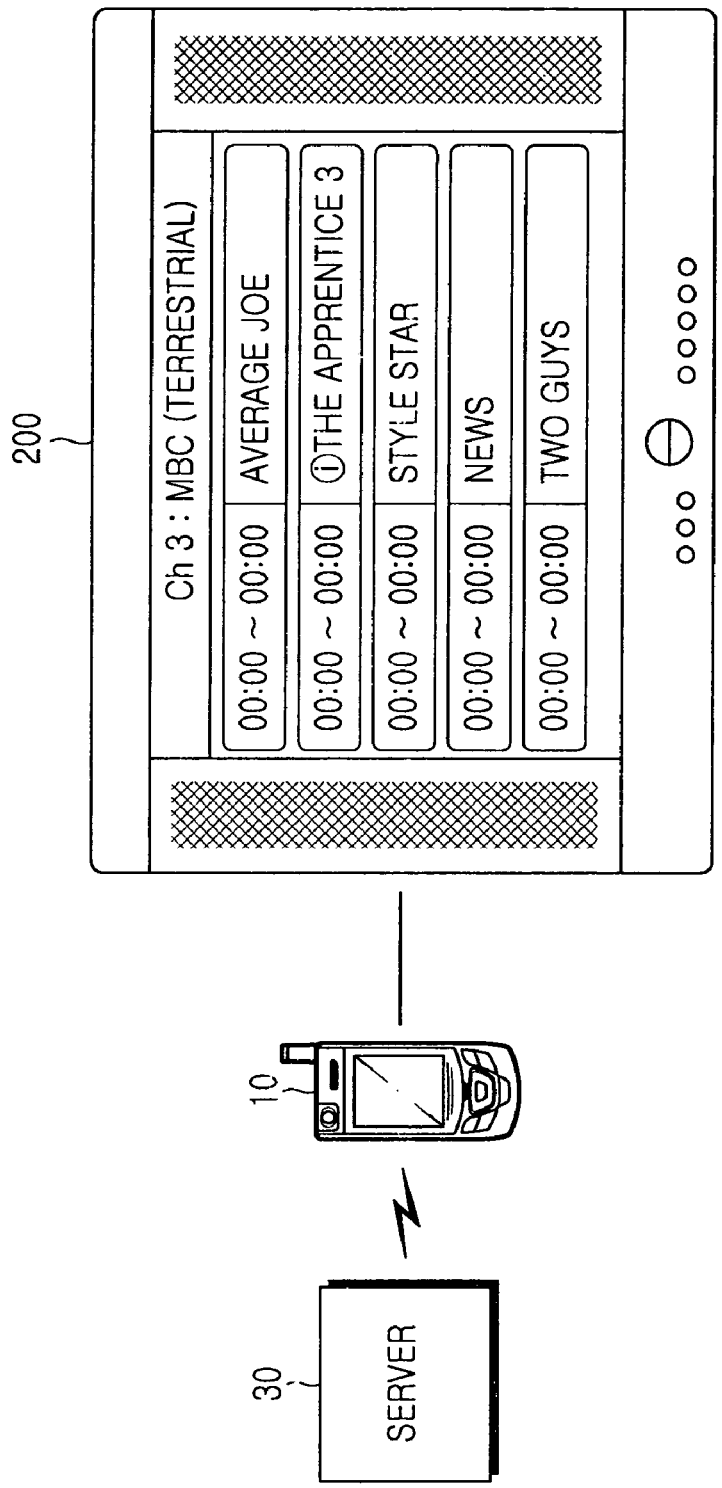
FIG. 4 explains a process in which a mobile communication terminal provides its functions while outputting DMB to an external AV device according to the present invention.

FIG. 4 is a view for explaining a process in which the mobile communication terminal 10 provides its functions while outputting DMB to an external AV device 20 according to the present invention.

It is assumed that the mobile communication terminal module 100 is capable of providing detailed information related to predetermined information that is selected from Electronic Program Guide (EPG) information received through the DMB module 200 of the mobile communication terminal 10 when the EPG information is displayed on the external AV device 20. If the user selects the predetermined information through the key input unit 700 to search for the detailed information related to the predetermined information when the external AV device 20 outputs the EPG information received through the external broadcasting output unit 600, the controller 300 connects to a server 30 for providing the detailed information related to the selected predetermined information through the mobile communication terminal module 100. The controller 300 receives the detailed information from the server 30 through the mobile communication terminal 100 and outputs the received detailed information to the user interface unit. In other words, upon selection of the predetermined information from the EPG information output to the external AV device 200, the controller 300 automatically switches the module for input/output of the operating signal to the mobile communication terminal module 100. The controller 300 then outputs the detailed information related to the predetermined information received through the mobile communication terminal module 100 through the user interface unit. The detailed information may include text data, video data, and audio data, and thus the controller 300 outputs the detailed information through both the display unit 500 and the audio output unit 400.

The server 30 may provide various services for DMB and may be a web server that provides a search engine on the Internet. In other words, the mobile communication terminal module 100 may connect to the server 30 through a mobile communication network, e.g., a Code Division Multiple Access (CDMA) network to receive the detailed information related to. the predetermined information. The mobile communication terminal 10 may also support Wireless Broadband (WiBro) Internet and connect to a web server that provides a search engine through a WiBro Internet network to search for and receive the detailed information related to the predetermined information.

As such, the mobile communication terminal 10 provides a function of the mobile communication terminal module 100 to the user interface unit while outputting DMB through the external AV device 20. Although the function of the mobile communication terminal 10 is related to DMB in FIG. 4, functions of the mobile communication terminal module 100 that can be provided by the mobile communication terminal 10 may be varied. Hereinafter, a process of providing a function of the mobile communication terminal 10 while outputting DMB to the external AV device 20 will be described in detail with reference to FIG. 5.

Figure 5:
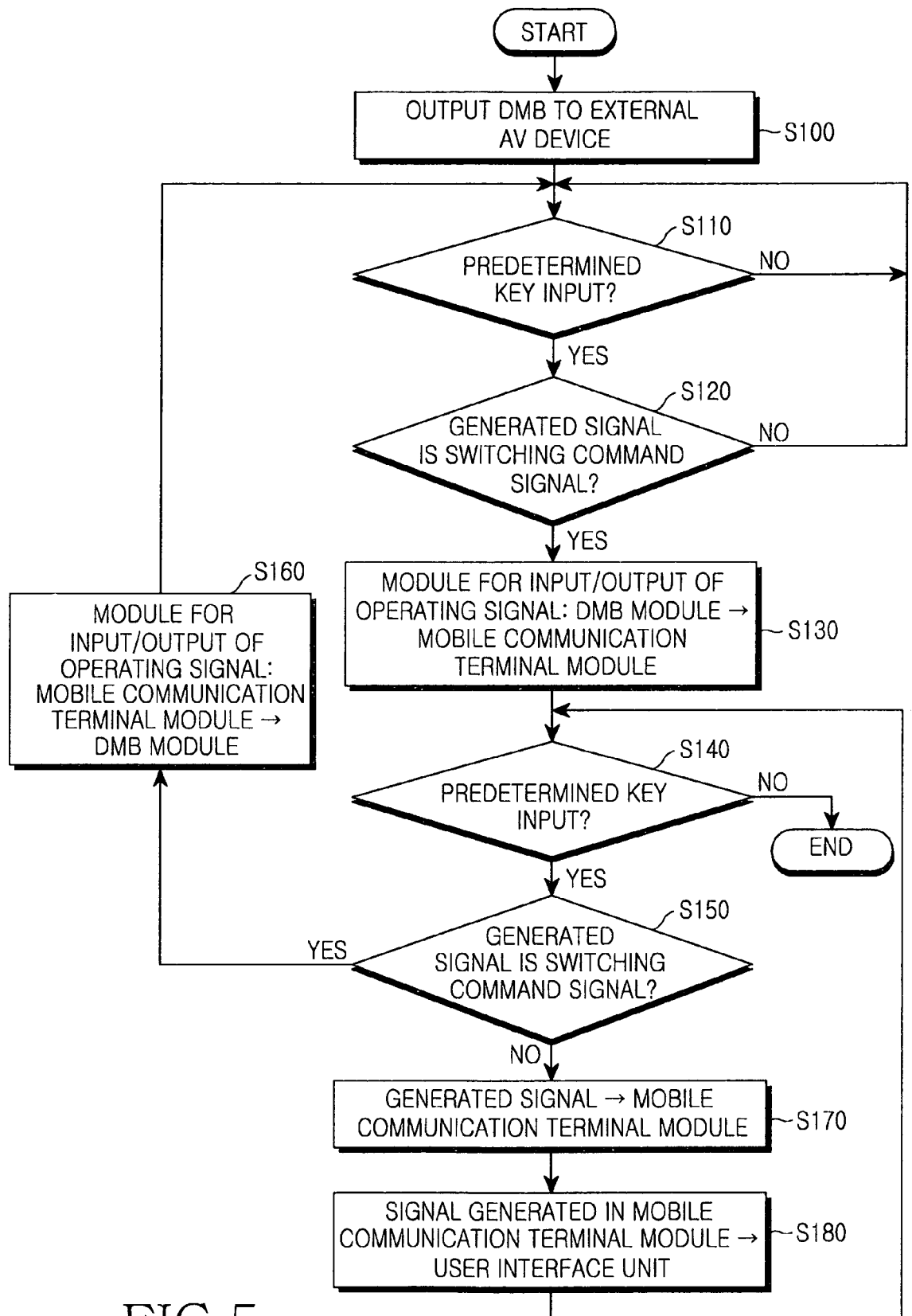
FIG. 5 is a flowchart illustrating a process in which a mobile communication terminal provides its functions while outputting DMB to an external AV device according to the present invention.

FIG. 5 is a flowchart illustrating a process in which the mobile communication terminal 10 provides its functions while outputting DMB to the external AV device 20 according to the present invention.

The mobile communication terminal 10 outputs DMB to the external AV device 20 through the external broadcasting output unit 600 in step S100. In step S100, the module for inputting an operating signal from and outputting the operating signal to the user interface unit is initialized to the DMB module 200. In step S110, the controller 300 checks if a predetermined key is input through the key input unit 700 while DMB is being output to the external AV device 20 through the external broadcasting output unit 600.

If the predetermined key is input, the controller 300 checks if a signal generated by the input key is the switching command signal in step S120. In other words, the controller 300 checks if there is the switching command signal generated by the input of the mode switching key. If the generated signal is the switching command signal, the controller 300 switches the module from the DMB module 200 to the mobile communication terminal module 100 in step S130. Thus, the user of the mobile communication terminal 10 can use various functions of the mobile communication terminal module 100 through the user interface unit while continuing to watch DMB through the external AV device 20.

While the module is switched to the mobile communication terminal module 100, the controller 300 checks if the predetermined key is input in step S140. If the predetermined key is input, the controller 300 checks if the signal generated by the input key is the switching command signal in step S150. In other words, the controller 300 checks if the mode switching key is. input again while the module is switched to the mobile communication terminal module 100. If the generated signal is the switching command signal, the controller 300 switches the module from the mobile communication terminal module 100 to the DMB module 200 in step S160.

Conversely, if the generated signal is not the switching command signal, i.e., the mode switching key is not input, the controller 300 outputs the signal generated by the input key in step S140 to the mobile communication terminal module 100 in step S170. Thus, the mobile communication terminal module 100 generates a signal for performing an operation corresponding to the input signal. The controller 300 outputs the signal generated by the mobile communication terminal module 100 to the user interface unit in step S180. In other words, the display unit 500 and the audio output unit 400 output the signal output from the mobile communication terminal module 100 without having an influence on DMB output through the external AV device 20.

Thus, the user can use various functions of the mobile communication terminal module 100 provided in the mobile communication terminal 10 while watching DMB through the external AV device 20. In other words, keys input by the user through the key input unit 700 to use various functions of the mobile communication terminal module 100 have no influence upon DMB that is output through the external broadcasting output unit 600. The display unit 500 and the audio output unit 400 output video signals and audio signals generated according to a function of the mobile communication terminal module 100 without having an influence upon DMB that is output through the external AV device 20.

As described above, according to the present invention, other functions can be performed during the output of DMB to an external AV device, thereby improving efficiency in the use of a mobile communication terminal. In addition, a user can use various functions of the mobile communication terminal while watching DMB. Furthermore, detailed information of DMB, which cannot be acquired from EPG information, can be provided.

While the present invention has been shown and described with reference to a preferred embodiment thereof, it will be understood by those skilled in the art that various changes in form and details may be made therein without departing from the spirit and scope of the invention.

What is claimed is:

1. A mobile communication terminal capable of receiving Digital Multimedia Broadcasting (DMB), comprising:
    a mobile communication terminal module for providing various functions of the mobile communication terminal except for DMB;
    a DMB module for receiving and outputting DMB;
    an external broadcasting output unit for outputting DMB received through the DMB module to an external Audio/Video (AV) device;
    a user interface unit for providing operations of the mobile communication terminal module and the DMB module and for receiving an input from the user, wherein the user interface unit comprises a mode switching key; and
    a controller for designating the mobile communication terminal module as a module for inputting an operating signal from and outputting the operating signal to the user interface unit if the controller senses a switching command signal for switching the module to the mobile communication terminal module through the user interface unit while DMB is output to the external AV device through the external broadcasting output unit, wherein the switching command signal is generated by the mode switching key;
    wherein the controller switches the module, from at least one of the mobile communication terminal module to the digital multimedia broadcasting module and the digital multimedia broadcasting module to the mobile communication terminal module, whenever the controller senses the switching command signal generated by the mode switching key.

2. The mobile communication terminal of claim 1, wherein when the mobile communication terminal module is designated as the module for inputting the operating signal from and outputting the operating signal to the user interface unit, the controller switches the module to the DMB module if the controller senses the switching command signal for switching the module to the DMB module.

3. The mobile communication terminal of claim 1, wherein the mode switching key is included in the user interface unit as a dedicated key for generating the switching command signal.

4. The mobile communication terminal of claim 1, wherein the mode switching key is a key included in the user interface unit which if pressed for a predetermined amount of time generates the switching command signal.

5. The mobile communication terminal of claim 1, wherein if selection of predetermined information from Electronic Program Guide (EPG) information received through the DMB module is input when the EPG information is output through the external AV device, the controller connects to a server for providing detailed information related to the selected predetermined information, receives the detailed information, and outputs the received detailed information through the user interface unit.

6. The mobile communication terminal of claim 5, wherein the detailed information includes text data, video data, and audio data and the user interface unit includes a display unit and an audio output unit to output the detailed information.

7. The mobile communication terminal of claim 6, wherein the mobile communication terminal module connects to the server through a mobile communication network.

8. The mobile communication terminal of claim 7, wherein the mobile communication terminal is a Code Division Multiple Access (CDMA) network terminal.

9. The mobile communication terminal of claim 5, wherein the mobile communication terminal supports Wireless Broadband (WiBro) Internet and the mobile communication terminal module connects to the server through a WiBro Internet network.

* * * * *